(No Model.)  2 Sheets—Sheet 1.

O. T. BUGG.
COTTON HARVESTER.

No. 383,099. Patented May 22, 1888.

Witnesses.
E. W. York,
Louis F. Gardner

Inventor:
O. T. Bugg,
per
F. A. Lehmann,
Atty

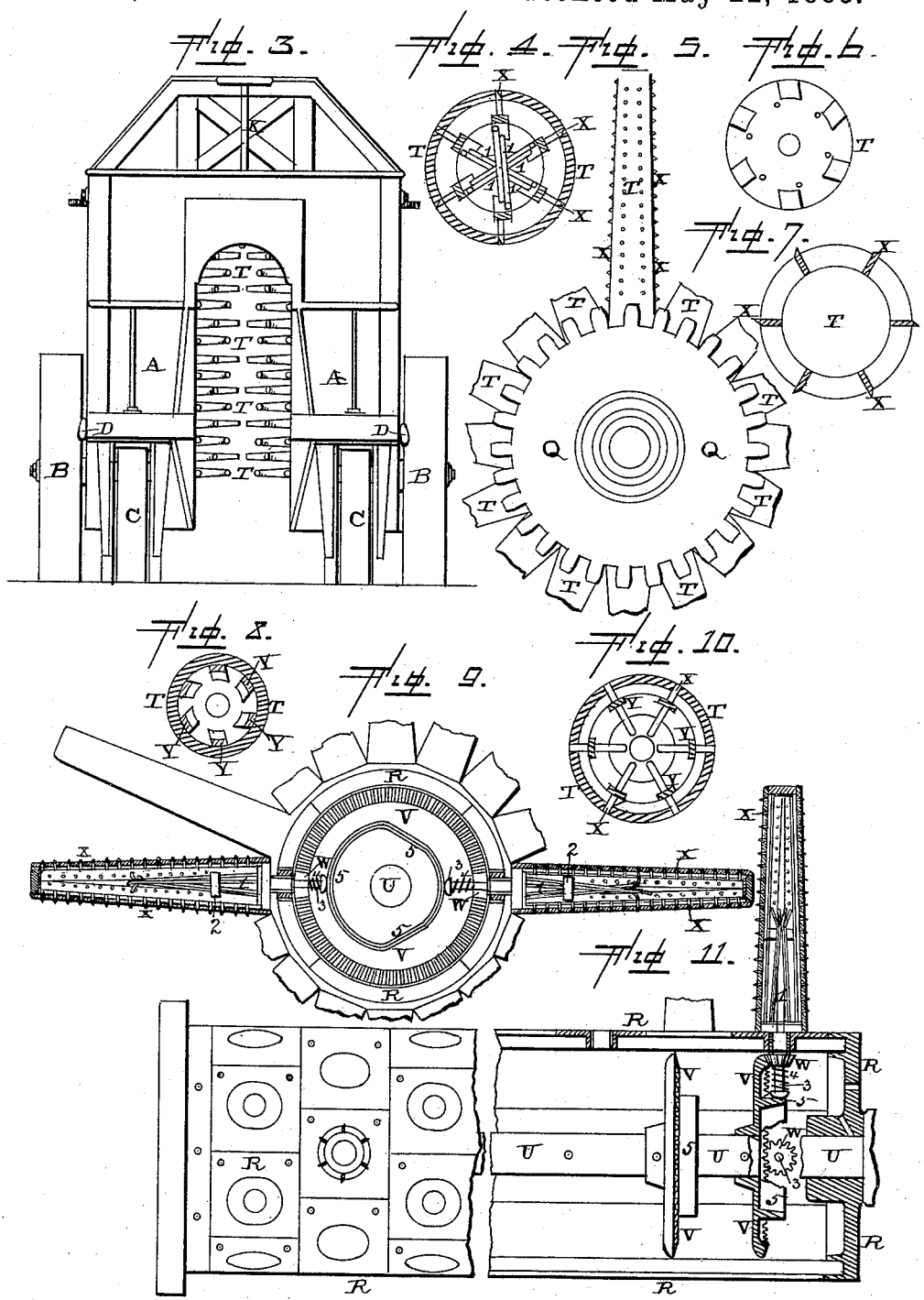

UNITED STATES PATENT OFFICE.

OWEN T. BUGG, OF LOUISVILLE, KENTUCKY, ASSIGNOR, BY MESNE ASSIGNMENTS, TO THE UNITED STATES COTTON HARVESTER COMPANY, OF NEW YORK.

COTTON-HARVESTER.

SPECIFICATION forming part of Letters Patent No. 383,099, dated May 22, 1888.

Application filed September 18, 1883. Serial No. 106,743. (No model.)

*To all whom it may concern:*

Be it known that I, OWEN T. BUGG, of Louisville, in the county of Jefferson and State of Kentucky, have invented certain new and useful Improvements in Cotton-Harvesters; and I do hereby declare the following to be a full, clear, and exact description of the invention, such as will enable others skilled in the art to which it pertains to make and use it, reference being had to the accompanying drawings, which form part of this specification.

My invention has relation to improvements in cotton-harvesters; and it consists in the construction and arrangement of parts, as will be hereinafter described, and particularly pointed out in the claims.

Figure 1:
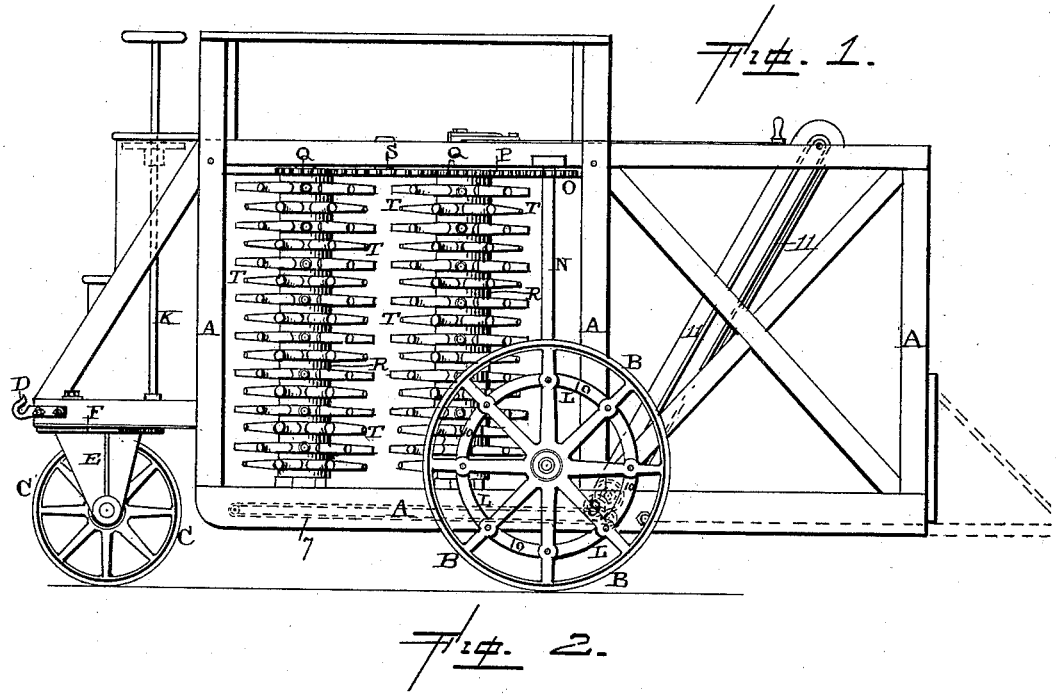
Figure 2:
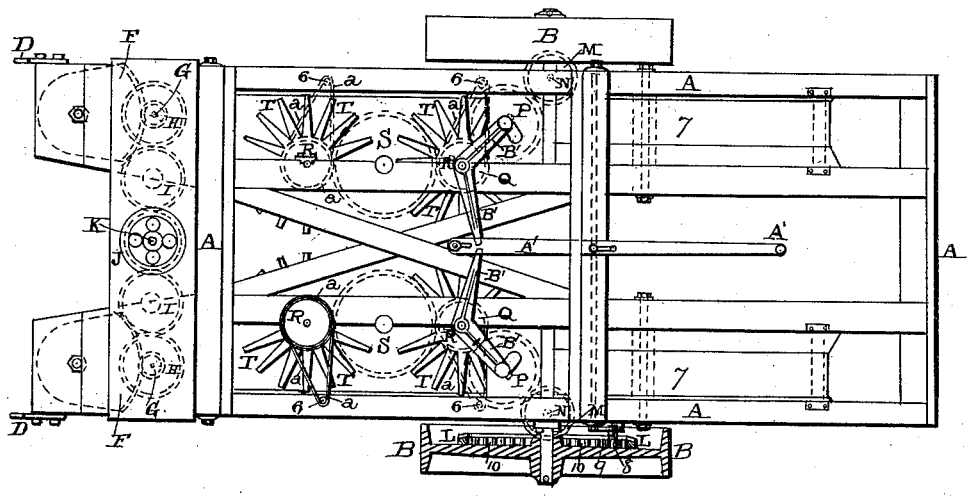

Figure 1 is a side elevation of a machine embodying my invention complete. Fig. 2 is a plan view of the same, shown partly in section. Fig. 3 is a front view of the machine. Figs. 4, 5, 6, 7, 8, 9, 10, and 11 are detail views of the cylinders and the fingers connected thereto.

A represents a suitable frame-work, of any desired shape, size, or construction that may be preferred. Although the frame-work shown is regarded by me as best adapted for the purpose, any other construction that may be preferred may be used. This frame-work is supported upon the two large driving-wheels B and the two front wheels, C. The draft-animals are to be attached at the extreme front end of the machine by means of the hooks or other suitable attachments, D. I do not limit myself to this construction, however, for any construction which will enable the animals to come upon opposite sides of the rows of cotton-plants will answer equally as well.

As this machine, like most others of this class, is intended to straddle the rows of plants, it becomes necessary that guiding apparatus shall be used for the purpose of enabling the machine to follow the rows of plants without being guided by the draft-animals. For this purpose the frames E, in which the wheels C are journaled, are provided with the segments F at their upper ends, and these segments are pivoted to one side of the center, as shown in Fig. 2. Each of these segments meshes with a pinion, G, which is secured or formed upon the same shaft as the wheel H, and this wheel H in turn meshes with a second wheel, I, which in turn meshes with a wheel, J, that is formed upon the lower end of the shaft K, which extends upward above the top of the machine, and which is provided with a suitable hand-wheel at its top. The driver, by turning this hand-wheel, can turn the front wheels, C, in such a manner as to guide the machine without any special relation to the forward movement of the draft-animals. This steering mechanism will be made the subject of a separate and distinct application, and no claim is now made to it in this one.

Each one of the driving-wheels B has a bevel gear-wheel, L, formed with or secured to its inner side, and with these bevel-wheels the pinions M on the lower end of the shafts N engage.

To the upper end of each shaft N is secured a spur-wheel, O, which in turn meshes with a movable spur-wheel, P, and these spur-wheels P in turn mesh with the gear wheels or teeth Q, formed upon the upper ends of the revolving cylinders R. The cylinders R upon the same side of the frame will be made to revolve in the same direction by means of an intermediate spur-wheel, S, as shown in Fig. 2. Only two of the revolving cylinders R are here shown upon each side; but it is evident that there may be any desired number of the cylinders. Each one of these cylinders is provided with a suitable number of revolving fingers, T, which begin revolving at the same time as the cylinder R and continue to revolve as long as the machine is in motion. The fingers will be of such a length that they will approach within about an inch of the fingers upon the cylinder placed upon the opposite side of the machine; but I do not limit myself in this respect. The fingers may be made to overlap the ends of the fingers upon the opposite cylinder, if so preferred. Inside of each of the cylinders is a vertical and stationary rod, U, upon which are fixed a series of bevel-gears, V, with which the pinions W upon the inner ends of the fingers mesh for the purpose of causing the fingers to revolve while the cylinder is in motion. The fingers may either be of the shape here shown or any other that may be preferred, and have secured to or formed upon their inner ends hollow hubs or shafts which extend through the sides of the cylinders, so as to receive the pinions upon them. Through each finger are made a suitable number of openings, of any desired shape or size, through which the barbs X project to any desired distance. These barbs will either be made straight or curved, as may be preferred, and are secured to movable plates Y, which are placed inside of the fingers, and which move in radial grooves at each end of the fingers for the purpose of preventing them from becoming displaced. Attached to the inner side of each of these plates is a suitable spring rod or wire, 1, and over these rods or wires is passed a contracting-ring, 2, which is connected to the endwise-moving rod 3, having the spring 4 placed upon its inner end, between the pinion and the head which is formed upon the rod. Each one of the rods 1 is rigidly secured at its inner end to the inner end of the finger, inside of which it is placed, while its outer end is secured to one of the plates to which the barbs are attached. These contracting-rings serve to contract the spring rods or wires when the ring is drawn inward by means of the action of the spring upon the rod, and to allow the spring-rods to throw the plates outward when the rod is forced outward by means of the cam-flanges 5, which are formed upon the stationary bevel-gears.

I do not limit myself to the exact construction here shown. If preferred, the expanding devices may be placed inside of the springs and force the barbs outward when the rod is forced outward by means of the cam-flanges 5, and have the springs draw the barbs inward when the rods are forced inward by their springs. The only difference between the two movements is, that when the expanding device is placed inside of the springs a positive movement is imparted to the barbs for the purpose of forcing them outward, instead of contracting them, as when the ring is placed upon their outer sides. The cam-flanges 5 are formed upon the tops of the bevel-gear plates, as shown in the detail views, and serve to operate the endwise-moving rods, so as to throw the barbs out while the fingers are among the branches of the cotton-plants, and to permit them to be retracted as soon as they leave the branches. These fingers revolve rapidly while the barbs gather the cotton from the open bolls, and hold it until the barbs are withdrawn, when, there being nothing to hold the cotton upon the fingers, it drops readily off.

In order to prevent any possibility of the cotton sticking to any of the fingers after the barbs have been withdrawn, there are a series of belts or cleaners, $a$, passed around each one of the cylinders, and around a revolving shaft, 6, placed at any suitable distance beyond the ends of the fingers. The cylinders in revolving revolve these belts, and these belts in turn revolve the loose shafts which serve as guides for them. These belts, passing outward from the cylinders and in between the annular rows of fingers, serve to clean the fingers very thoroughly from any cotton which might possibly adhere to the barbs.

I do not limit myself to the use of the belts alone, for any other suitable cleaning mechanism may be used for this purpose. As the cotton drops from the fingers, it falls upon the endless carriers 7, arranged in the bottom of the frame, which carriers are operated by the short shaft or roller 8, which has a pinion, 9, secured to its outer end, so as to engage with the internally-toothed rack or wheel 10 upon the bevel-gears, which are secured to the inner sides of the driving-wheels B. These endless carriers 7 serve to carry the cotton backward to a suitable elevating device, 11, of any desired construction, which elevators carry the cotton upward and drop it into a bag or receptacle placed to receive it. The person standing upon the rear end of the machine will bag the cotton, and either throw the filled bags off upon the ground, to be afterward picked up, or else throw them upon the top of the frame, to be carried to the end of the row.

In order to enable the person who rides behind to control the action of the cylinders and to enable the cylinders to be thrown out of gear when the machine is moving from place to place, there is provided a bar, A', which is slotted at its front end and near its middle at the point where the pivotal pin passes through it, so as to allow the bar an endwise movement. Connected to this bar in any suitable way are the bell-crank levers B', which have connected to them at their outer ends the movable gears P, which cause the cylinders to revolve. When this bar is forced forward, the movable gears are moved inward toward each other the full length of the slots made through the top of the frame, for the purpose of throwing them out of gear with the cylinders, and when the bar is moved in the opposite direction the wheels are moved outward, so as to again mesh with the cylinders.

I am aware that a cotton-harvester provided with a rotary cylinder having a fixed shaft, with annular gears rigid on said shaft, in combination with the picker-stems extending radially from and bearing in the cylinder, and gears on said picker-stems meshing with said annular gears, is not new, and I do not claim such devices, broadly.

Having thus described my invention, I claim—

1. In a cotton-harvesting machine, the combination of revolving cylinders provided with revolving perforated fingers, barbs placed within the fingers, and mechanism for retracting the barbs at certain points, substantially as specified.

2. In a cotton-harvesting machine, the combination of revolving cylinders, revolving perforated fingers mounted thereon, means for causing the fingers to revolve, barbs placed inside of the fingers, a spring-actuated rod provided with an expanding or contracting device for operating the barbs, and mechanism for imparting an endwise movement to the rod, substantially as specified.

3. The combination, in a cotton-harvesting machine, of revolving cylinders, perforated fingers provided with inclosed barbs adapted to be projected and withdrawn and mounted on the cylinders, a stationary rod placed inside of each cylinder, a series of annular gears on the rod, and pinions connected to the fingers to cause them to revolve while the cylinder is in motion, substantially as shown and described.

4. In a machine for harvesting cotton, the combination of the revolving cylinders, the mechanism for operating them, the stationary rods placed inside of the cylinders and provided with stationary gears having the cam-flanges 5, the rotating fingers having pinions for engaging the stationary gears, barbs placed within the fingers, and endwise spring-actuated rods for moving the barbs, the rods being moved in one direction by means of the springs and in the other direction by means of the cam-flanges, substantially as described.

5. In a cotton-harvesting machine, the combination of a series of revolving perforated fingers, a suitable moving body or bodies to which the fingers are attached, barbs placed inside of the fingers, means by which the said barbs are forced out and then retracted, and mechanism for cleaning the cotton from the fingers after the barbs have been retracted, substantially as set forth.

6. The combination of the fingers of the plates Y, carrying the barbs X, the rods 1, and the expanding and contracting mechanism, substantially as specified.

7. In a machine for harvesting cotton, the combination of a revolving cylinder, a series of revolving fingers mounted thereon, a series of barbs inside of said fingers adapted to be projected and withdrawn, and a series of gears, cams, and springs inside of said cylinder for revolving the fingers and operating the barbs, substantially as specified.

8. The combination of the revolving cylinder provided with a series of revolving barbed fingers, the belts $a$, and revolving shafts 6, the belts being passed around the cylinders and shafts for the purpose of stripping the adhering cotton from the fingers, substantially as shown.

In testimony whereof I affix my signature in presence of two witnesses.

OWEN T. BUGG.

Witnesses:
F. A. LEHMANN,
J. ALF. HAYWARD.